Oct. 6, 1931.   M. G. T. SCHROEDER   1,826,028
PROCESS FOR THE PRODUCTION OF SULPHITE LIQUOR
Filed Feb. 29, 1928
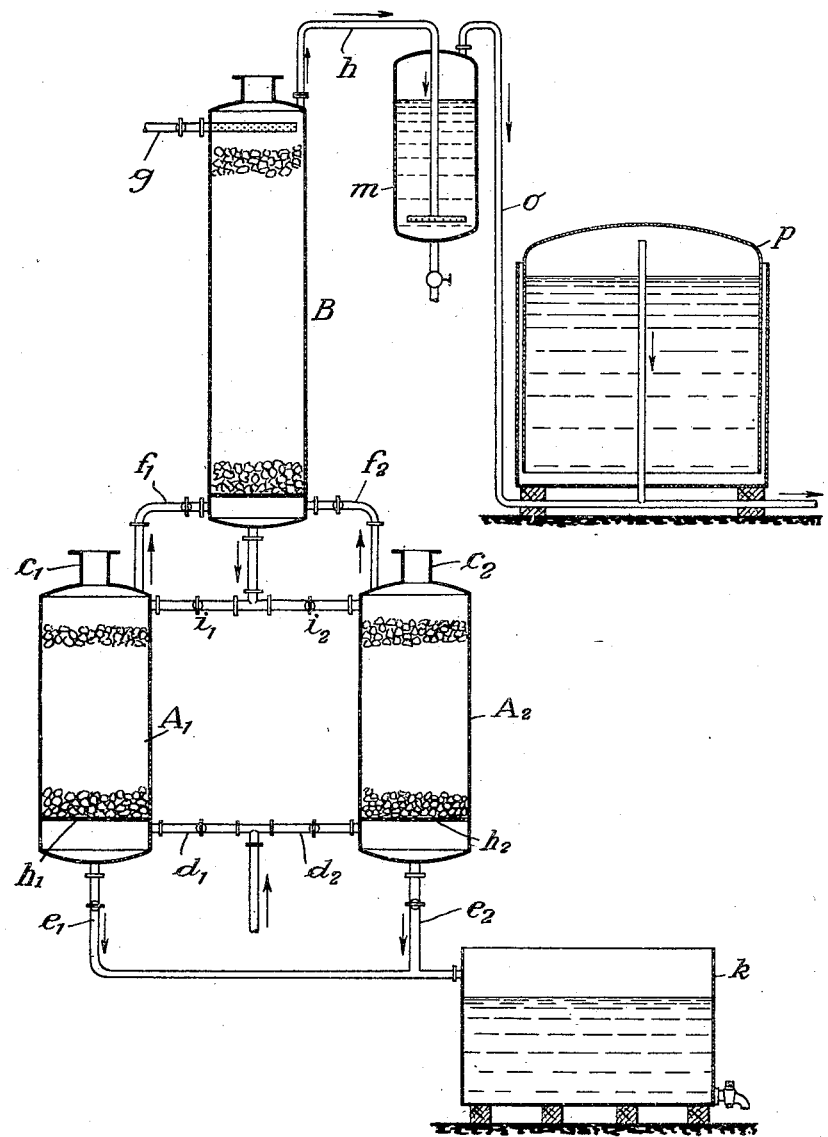

Patented Oct. 6, 1931

1,826,023

UNITED STATES PATENT OFFICE

MAX GEORG THEODOR SCHROEDER, OF BERLIN, GERMANY

PROCESS FOR THE PRODUCTION OF SULPHITE LIQUOR

Application filed February 29, 1928, Serial No. 258,118, and in Germany August 16, 1927.

My invention refers to the production of waste sulphite liquor and more especially to means whereby in this production pure carbon dioxide can be recovered as a by-product.

Hitherto sulphite liquor for use in the treatment of cellulose is produced in such manner that the gases of combustion of sulphur or burner gases, being products of calcination of pyrites, after having been cooled down, are conducted through towers in countercurrent to water trickling down in these towers, which are moreover filled with pieces of lime stone or dolomite. The towers have also been replaced by troughs. Now in view of the fact that the burner gases only contain about 8 to 10 per cent per volume $SO_2$, the gases of combustion of sulphur not more than 15 to 18 per cent, and that in producing the over-acid sulphite liquors, 3 volumes sulphur dioxide correspond to only 1 volume carbon dioxide produced, the contents of carbonic acid in the waste gases is so low as not to allow a commercial extraction. Therefore the large quantity of carbonic acid, which might be recovered in pure state as a cheap by-product in the manufacture of sulphite liquor, is lost altogether. In those cases, where the carbonic acid is extracted from the gas mixture by absorption in water under high pressure, the use of carbonic acid contained in lime kiln gases, which contain about 30 per cent per volume $CO_2$, is far more preferable.

In order to recover carbonic acid in the sulphite liquor production in a commercial manner, the process must be so conducted that the carbon dioxide is not separated from the exhaust gases, but the sulphur dioxide must already be separated from the other gases accompanying same in the beginning of the operations. Inasmuch as the solubility of sulphur dioxide in water is more than 40 times greater than that of carbon dioxide the absorption of sulphur dioxide and separation from the other gases only requires a little part of the expenditure which would be required for the separation of carbon dioxide. Therefore the new method based on these facts is distinguished from the methods hitherto used in that the gases containing $SO_2$ are not caused to act directly on the carbonates, but that at first a watery solution of sulphur dioxide is prepared, the percentage of which suffices for furnishing after dissolution of lime stone or other carbonates in this solution under development of carbonic acid a sulphite liquor of sufficient strength or at least a liquor which is strong enough to allow being subsequently brought to the required percentage of $SO_2$ by the sulphur dioxide gas escaping from the boilers.

Inasmuch as the sulphite liquors for the treatment of cellulose must have a total content of 4 to 5 per cent of sulphur dioxide, and as the carbon dioxide gas on being developed still carries away a considerable percentage of $SO_2$, the manufacture of full-grade sulphite liquors requires a watery solution containing about 5 to 6 per cent sulphur dioxide. Now this percentage cannot be obtained by simply absorbing the burner or sulphur combustion gases in water. For obtaining a solution having such a high percentage of sulphur dioxide, either the gases must be absorbed under pressure or $SO_2$ must first be produced in any suitable manner and the gas must then be caused to be absorbed in water.

The pressure to be used for the absorption in order to obtain a sufficiently strong solution is inversely proportional to the contents of $SO_2$ in the gases to be operated upon and to the temperature of the absorption water. It is the lower, the higher the $SO_2$ contents of the gases and the lower the temperature of the water. When operating with gases of combustion of sulphur rich in $SO_2$ and with cold water, a pressure of 2 to 3 atms. will suffice, while with burner gases of pyrites about 4 to 5 atms. are required.

In compensation for this expenditure in energy not only the sulphite liquor production as such is greatly simplified, but also a carbon dioxide substantially free from other gases is obtained. Instead of the very high lime stone towers at present in use the production of sulphite liquor according to the present invention only requires very simple and comparatively small apparatus, such as illustrated diagrammatically by way of example in the drawing, this apparatus being adapted for use in carrying out a continuous operation.

Referring to the drawing, $A_1$ and $A_2$ are two iron reservoirs, the inner walls of which are covered with lead, and $c_1$ and $c_2$ are manholes for filling in pieces of lime stone, which rest on the perforated double bottoms $h_1$ and $h_2$. $d_1$, $d_2$ are pipes provided with valves, through which the solution of $SO_2$ from the absorption under pressure can be admitted either in the reservoir $A_1$ or reservoir $A_2$. Pipes $e_1$ and $e_2$ serve for draining the reservoirs and for conducting the finished liquor to the tanks such as $k$. On the solution of sulphur dioxide entering a reservoir, a vigorous development of carbon dioxide gas will take place, this gas being carried through pipes $f_1$ or $f_2$ to an absorber B which serves for absorbing any $SO_2$, which may be carried away by the carbon dioxide. This comparatively small absorber, which has to provide room only for 1/20th to 1/30th of the gas volume which had hitherto to be accomodated in the absorption towers may either be filled with pieces of lime stone or, if it is desired to avoid the refilling, with coke or some acid-proof material. Water is supplied to the absorber B by means of the sprinkler pipe $g$ and all the sulphur dioxide is here extracted from the carbon dioxide gas. The pure carbon dioxide escapes through pipe $h$ into a washer $m$, filled with a solution of bicarbonate, escaping from the washer through pipe $o$ into a gasometer $p$.

In order to produce the carbon dioxide in an uninterrupted stream, the preparation of the sulphite liquor is carried out in the reservoirs $A_1$ and $A_2$ alternately. While one of the reservoirs is in operation, sulphite liquor is exhausted from the other one, fresh lime stone being filled in, if necessary. The solution escaping from the absorber B can be conducted either to the reservoir $A_1$ or to the reservoir $A_2$ as desired through pipes $f_1$ or $f_2$ respectively.

Instead of producing a solution of sulphur dioxide sufficiently strong for the preparation of the sulphite liquors, I may also use pure $SO_2$ gas for the production of pure carbon dioxide, the $SO_2$ being introduced into an apparatus filled with a suitable carbonate and water or being conducted in countercurrent to water trickling down a tower filled with lime stone. To this end the sulphur dioxide must first be expelled from its watery solution or must be produced in pure state in some other way. Such process can be carried through in a commercial manner only where fresh or exhaust steam is available at low cost. On the other hand the process with solutions rich in $SO_2$ and obtained directly by absorption merely requires power for compression, which is frequently available in natural sources of energy without requiring any expenditure for coal. The power consumption can be limited to a minimum, for the pressure of the exhaust gases is utilized again for the compression, more especially, if these gases are reheated before expanding in the engine, for instance by the heat of the sulphur burners or by some other exhaust heat, which is available free of cost.

When manufacturing a sulphite liquor such as required for use and having a content of lime between 1 and 1.2 per cent about 7 to 8 kgs. pure carbon dioxide can be recovered as a by-product per cubic meter of liquor. This carbon dioxide can either be utilized for special purposes, for instance for a precipitation of bicarbonate in the manufacture of soda according to the ammonia process, which does not require any energy and does not furnish any exhaust gases, or it can be liquefied or solidified by compression and can be sold in this condition.

Various changes may be made in the details disclosed in the foregoing specification without departing from the invention or, sacrificing the advantages thereof.

I claim:—

1. The method of producing sulphite liquor and pure carbon dioxide comprising extracting a gas containing sulphur dioxide with water under pressure for the recovery of $SO_2$ from said gas, acting with the $SO_2$-solution thus obtained on a decomposable carbonate and collecting the carbon dioxide gas.

2. The method of producing sulphite liquor and pure carbon dioxide comprising extracting a gas containing sulphur dioxide with water under pressure for the recovery of $SO_2$ from said gas, acting with the $SO_2$-solution thus obtained on a decomposable carbonate, collecting the carbon dioxide gas and washing same to remove the sulphur dioxide still admixed to it.

3. The method of producing sulphite liquor and carbon dioxide which comprises absorbing sulphur dioxide in water under pressure to form a concentrated solution of sulphurous acid, subjecting a decomposable carbonate to the action of the resulting solution, and collecting the resulting gaseous and liquid reaction products.

4. The method of producing sulphite liquor and carbon dioxide which comprises dissolving sulphur dioxide from a mixture of gases with water under pressure to form a concentrated solution of sulphurous acid, subjecting a decomposable carbonate to the action of the resulting solution, and collecting the resulting gaseous and liquid reaction products.

In testimony whereof I affix my signature.

MAX GEORG THEODOR SCHROEDER.